United States Patent
Otowa

(10) Patent No.: US 9,116,595 B2
(45) Date of Patent: Aug. 25, 2015

(54) DEVICE, METHOD, AND STORAGE MEDIUM STORING PROGRAM

(71) Applicant: KYOCERA CORPORATION, Kyoto (JP)

(72) Inventor: Shuhei Otowa, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 164 days.

(21) Appl. No.: 13/630,094

(22) Filed: Sep. 28, 2012

(65) Prior Publication Data

US 2013/0076684 A1   Mar. 28, 2013

(30) Foreign Application Priority Data

Sep. 28, 2011 (JP) ................................. 2011-213469
Sep. 27, 2012 (JP) ................................. 2012-215177

(51) Int. Cl.
*G06F 3/041* (2006.01)
*G06F 3/0481* (2013.01)
*G06F 3/0488* (2013.01)

(52) U.S. Cl.
CPC .......... *G06F 3/0481* (2013.01); *G06F 3/04883* (2013.01)

(58) Field of Classification Search
CPC ................................ G06F 3/017; G06F 3/0481
USPC .................... 345/156–184; 715/867
See application file for complete search history.

(56) References Cited

U.S. PATENT DOCUMENTS

| | | | |
|---|---|---|---|
| 2006/0055662 A1* | 3/2006 | Rimas-Ribikauskas et al. | 345/156 |
| 2008/0155481 A1* | 6/2008 | Kim et al. | 715/867 |
| 2008/0165160 A1 | 7/2008 | Kocienda et al. | |
| 2011/0199637 A1* | 8/2011 | Yoshida et al. | 358/1.15 |
| 2011/0252375 A1* | 10/2011 | Chaudhri | 715/835 |
| 2012/0110496 A1* | 5/2012 | Lee et al. | 715/778 |
| 2012/0113001 A1* | 5/2012 | Yamauchi et al. | 345/157 |
| 2012/0113095 A1* | 5/2012 | Hwang et al. | 345/419 |
| 2012/0117290 A1* | 5/2012 | Sirpal et al. | 710/303 |
| 2012/0165076 A1* | 6/2012 | Yu et al. | 455/566 |
| 2012/0169776 A1* | 7/2012 | Rissa et al. | 345/676 |
| 2012/0242599 A1* | 9/2012 | Seo et al. | 345/173 |
| 2013/0104017 A1* | 4/2013 | Ko et al. | 715/205 |
| 2013/0145295 A1* | 6/2013 | Bocking et al. | 715/764 |
| 2013/0249843 A1* | 9/2013 | Yano | 345/173 |
| 2013/0321340 A1* | 12/2013 | Seo et al. | 345/174 |

FOREIGN PATENT DOCUMENTS

WO   2008086302 A1   7/2008

* cited by examiner

*Primary Examiner* — Prabodh M Dharia
(74) *Attorney, Agent, or Firm* — Lowe Hauptman & Ham, LLP

(57) ABSTRACT

According to an aspect, a device includes a touch screen display and a controller. The touch screen display displays a home screen. When a flick gesture in a first direction is performed on a first home screen displayed on the touch screen display, the controller changes the first home screen to a second home screen according to a first rule. When a flick gesture in a second direction is performed on the first home screen displayed on the touch screen display, the controller changes the first home screen to a third home screen according to a second rule.

12 Claims, 12 Drawing Sheets

FIG.6

| | Contents | Direction of Flick Gesture Performed on Home Screen | Home Screen to be displayed |
|---|---|---|---|
| 90a | Rule | Right | Left side of the displayed home screen |
| | | Left | Right side of the displayed home screen |
| 90b | Rule | Up | Fifth from the left |
| | | Down | Far right |
| 90c | Rule | Up | Third to the right of the displayed home screen |
| | | Down | Third to the left of the displayed home screen |

9D

DEVICE, METHOD, AND STORAGE MEDIUM STORING PROGRAM

CROSS-REFERENCE TO RELATED APPLICATIONS

This application claims priority from Japanese Application No. 2011-213469, filed on Sep. 28, 2011, and Japanese Application No. 2012-215177, filed on Sep. 27, 2012, the contents of which are incorporated by reference herein in their entireties.

BACKGROUND

1. Technical Field

The present application relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen display. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many of the touch screen display devices display a screen called a home screen on the touch screen display. Many of these devices is configured to change the home screen displayed on the touch screen display to a home screen next thereto when detecting a user's gesture performed on the touch screen display.

For the foregoing reasons, there is a need for a device, a method, and a program that improve an operability of changing a home screen to another home screen.

SUMMARY

According to an aspect, a device includes a touch screen display and a controller. The touch screen display displays a home screen. When a flick gesture in a first direction is performed on a first home screen displayed on the touch screen display, the controller changes the first home screen to a second home screen according to a first rule. When a flick gesture in a second direction is performed on the first home screen displayed on the touch screen display, the controller changes the first home screen to a third home screen according to a second rule.

According to another aspect, a method is for controlling a device including a touch screen display. The method includes: displaying a first home screen on the touch screen display; changing the first home screen to a second home screen according to a first rule when a flick gesture in a first direction is performed on the first home screen displayed on the touch screen display; and changing the first home screen to a third home screen according to a second rule when a flick gesture in a second direction is performed on the first home screen displayed on the touch screen display.

According to another aspect, a non-transitory storage medium stores therein a program. When executed by a device including a touch screen display, the program causes the device to execute: displaying a first home screen on the touch screen display; changing the first home screen to a second home screen according to a first rule when a flick gesture in a first direction is performed on the first home screen displayed on the touch screen display; and changing the first home screen to a third home screen according to a second rule when a flick gesture in a second direction is performed on the first home screen displayed on the touch screen display.

BRIEF DESCRIPTION OF THE DRAWINGS

FIG. 6 is a diagram illustrating an example of contents stored in a changing rule table;

DETAILED DESCRIPTION

Exemplary embodiments of the present invention will be explained in detail below with reference to the accompanying drawings. A smartphone will be explained below as an example of a device provided with a touch screen display.

Figure 1:
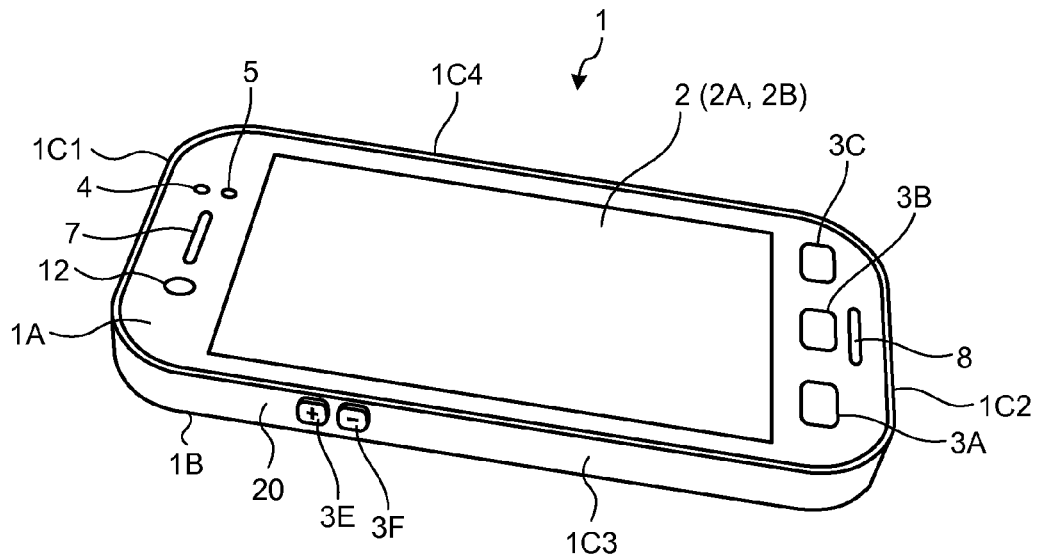
FIG. 1 is a perspective view of a smartphone according to an embodiment.
Figure 2:
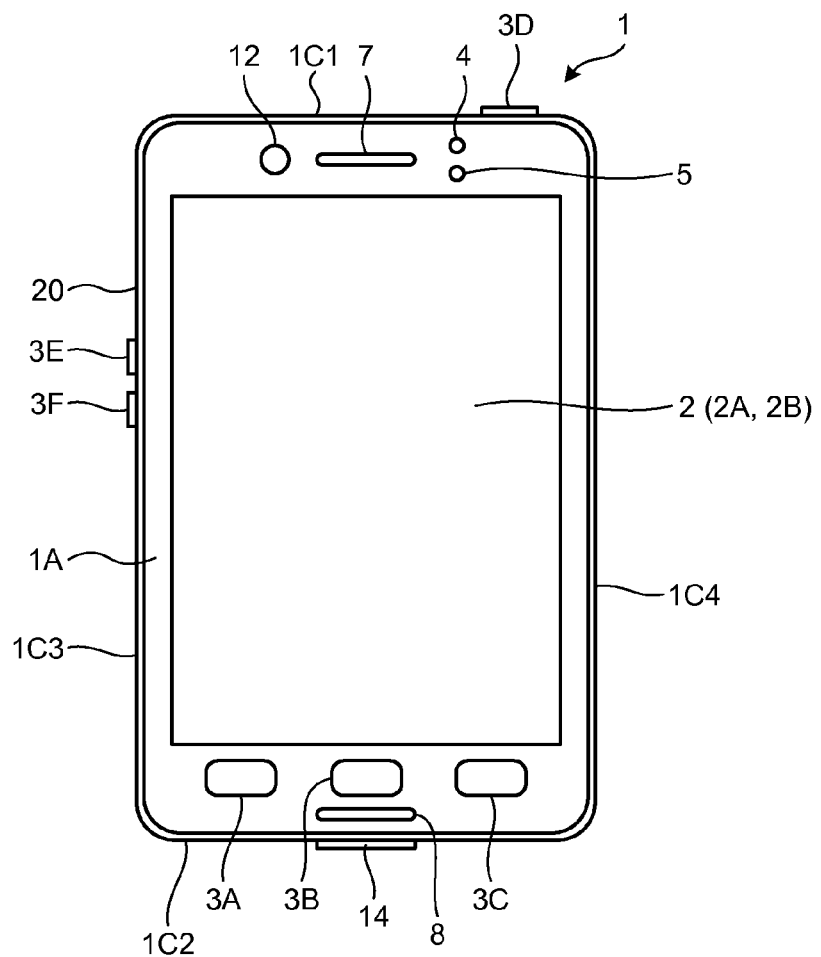
FIG. 2 is a front view of the smartphone.
Figure 3:
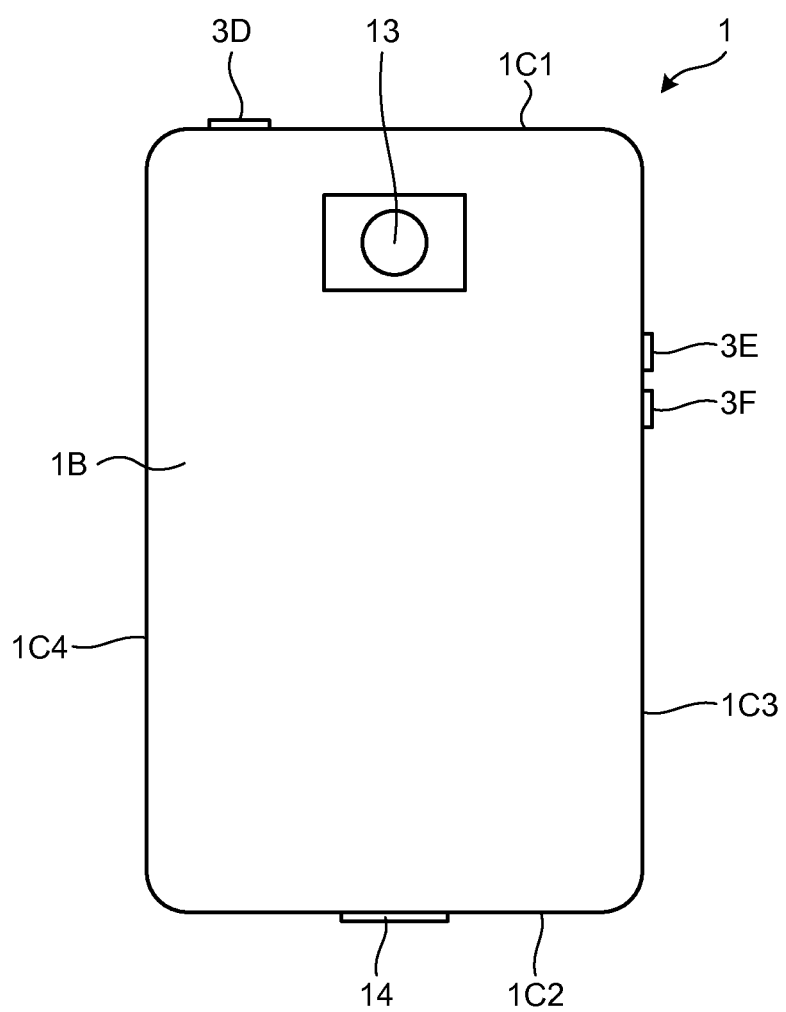
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a camera 13, which is provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, pen, stylus pen, and the like may be referred to as a "contact object" or an "object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the description herein below, a gesture performed by using a finger may be referred to as a "single touch gesture", and a gesture performed by using a plurality of fingers may be referred to as a "multi touch gesture". Examples of the multi touch gesture include a pinch in and a pinch out. A tap, a flick, a swipe, and the like are a single touch gesture when performed by using a finger, and are a multi touch gesture when performed by using a plurality of fingers.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X" or "the controller detects X".

Figure 4:
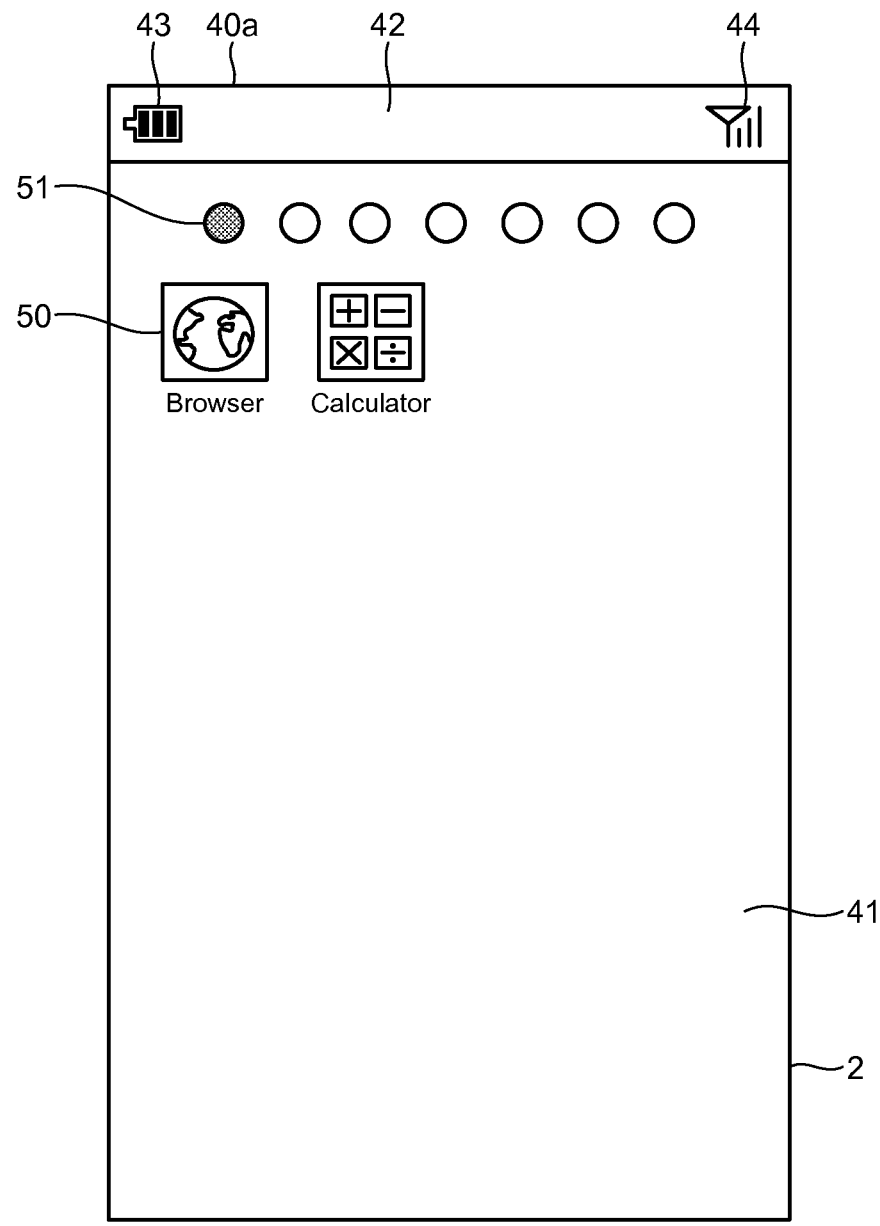
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application. The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes seven symbols. This means the number of home screens is seven. Each of the symbols has a round shape. According to the indicator 51 in the example illustrated in FIG. 4, the symbol on the far left is displayed in a different manner from that of the other symbols. Specifically, the symbol on the far left is displayed with a filled circle while the other circles are displayed with unfilled circles. This means that the home screen on the far left is currently displayed on the display 2A.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen. When the home screen to be displayed is changed, the smartphone 1 updates the display of the indicator 51 according to the changed home screen. A description of processes in which the smartphone 1 changes the home screen in response to a flick gesture will be given in detail later.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

A vertical direction of the home screen 40 will be explained below. The vertical direction of the home screen 40 is based on a vertical direction of text or an image displayed on the display 2A. Therefore, in the home screen 40, the side close to the area 42 in a longer side direction of the touch screen display 2 is the upper side of the home screen 40, and the side far from the area 42 is the lower side of the home screen 40. The side near which the radio-wave level mark 44 is displayed in the area 42 is the right side of the home screen 40, and the side near which the remaining mark 43 is displayed in the area 42 is the left side of the home screen 40.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
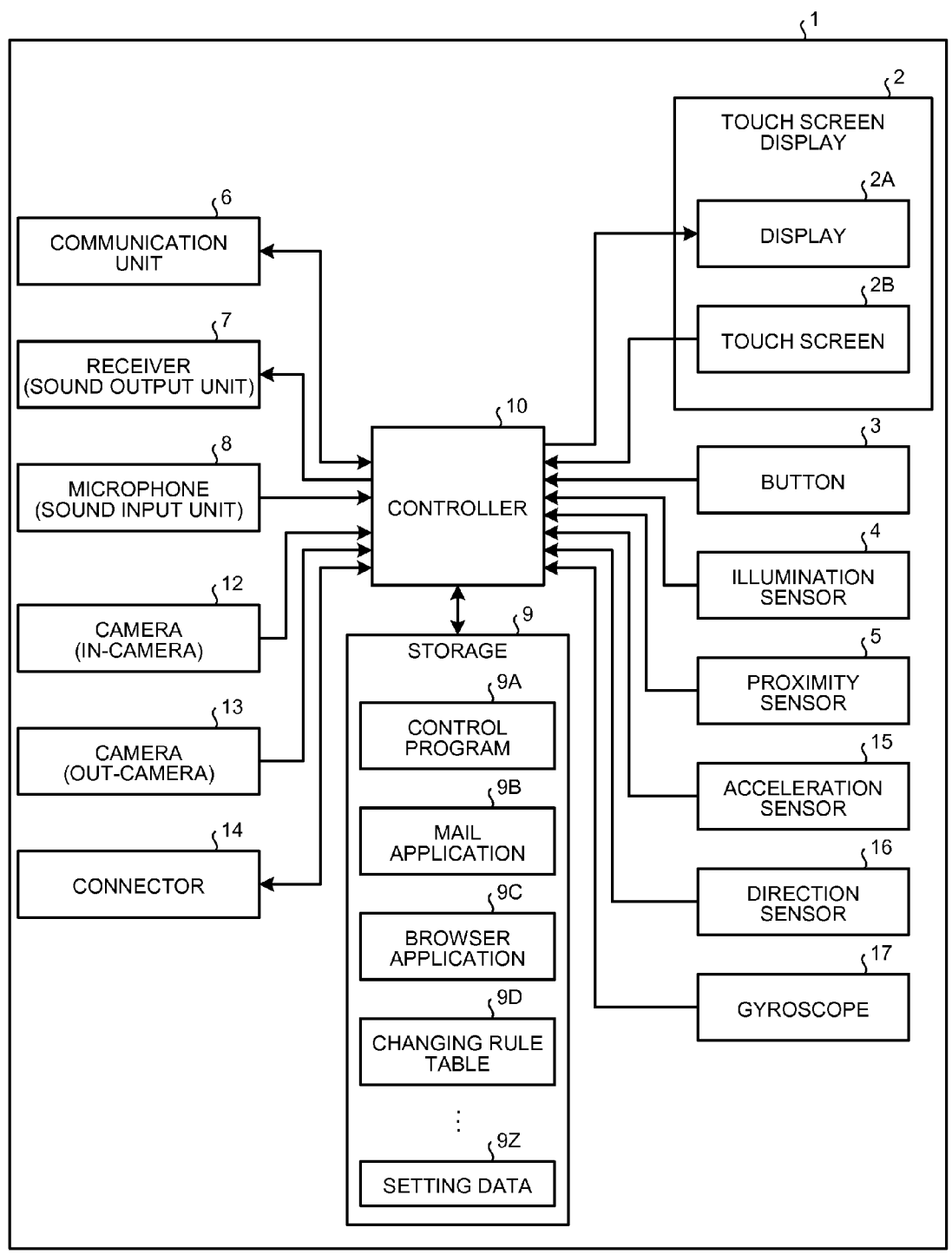
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects a gesture performed for the smartphone 1. Specifically, the controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards. The communication unit 6 may support wired communication. Examples of the wired communication include Ethernet, Fibre Channel, etc.

The receiver 7 is a sound output unit. The receiver 7 outputs a sound signal transmitted from the controller 10 as sound. The receiver 7 is used, for example, to output voice of the other party on the phone. The smartphone 1 may include a speaker in addition to, or in stead of, the receiver 7. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, a changing rule table 9D, and setting data 9Z. The mail application 9B provides an e-mail function for composing, transmitting, receiving, and displaying e-mail, and the like. The browser application 9C provides a WEB browsing function for displaying WEB pages. The setting data 9Z provides a setting function for various settings on the operations of the smartphone 1.

The control program 9A provides a function related to various controls for operating the smartphone 1. The control program 9A controls, for example, the communication unit 6, the receiver 7, and the microphone 8 to make a phone call. The functions provided by the control program 9A include a function for changing the home screen to another home screen according to changing rules of the changing rule table 9D. The functions provided by the control program 9A can be used in combination with a function provided by the other program such as the mail application 9B.

The changing rule table 9D is data in which a direction of a flick gesture performed on a home screen displayed on the display is associated with a home screen to be displayed according to the flick gesture. These changing rules will be explained in detail later.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, and the receiver 7. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes the control program 9A, for example, to change the home screen 40 to another home screen according to the changing rules of the changing rule table 9D.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Then, the changing rule table 9D will be explained below with reference to FIG. 6. FIG. 6 is a diagram illustrating an example of contents stored in the changing rule table 9D. As illustrated in FIG. 6, the changing rule table 9D stores therein a rule 90a, a rule 90b, and a rule 90c. The rule 90a is an example of a first rule according to the embodiment. The rule 90b and the rule 90c are examples of a second rule according to the embodiment. The changing rule table 9D stores therein a direction of a flick gesture performed on a home screen displayed on the display 2A and a home screen to be displayed according to the flick gesture in association with each other for each rule.

For example, the rule 90a defines that when a rightward flick performed on the home screen displayed on the display 2A is detected, a home screen located in the left side of the displayed home screen is newly displayed on the display 2A. The rule 90a also defines that when a leftward flick performed on the home screen displayed on the display 2A is detected, a home screen located in the right side of the displayed home screen is newly displayed on the display 2A.

The rule 90b defines that when an upward flick performed on the home screen displayed on the display 2A is detected, a fifth home screen from the left is newly displayed on the display 2A. The rule 90b also defines that when a downward flick performed on the home screen displayed on the display 2A is detected, a home screen on the far right is newly displayed on the display 2A.

The rule 90c defines that when an upward flick performed on the home screen displayed on the display 2A is detected, a home screen which is third to the right of the displayed home screen is newly displayed on the display 2A. The rule 90c also defines that when a downward flick performed on the home screen displayed on the display 2A is detected, a home screen which is third to the left of the displayed home screen is newly displayed on the display 2A.

The rule 90b and the rule 90c associate the flick gestures in the same directions with different locations of home screens to be displayed, respectively. Therefore, the smartphone 1 selects either one of the rule 90b and the rule 90c. The changing rule table 9D can further store not only the three changing rules but also some other changing rules. The contents of the changing rules stored in the changing rule table 9D may be changed by the user.

Below are examples of control performed by the smartphone 1 in which the home screen is changed to another home screen according to a user's gesture performed on the touch screen display.

Figure 7:
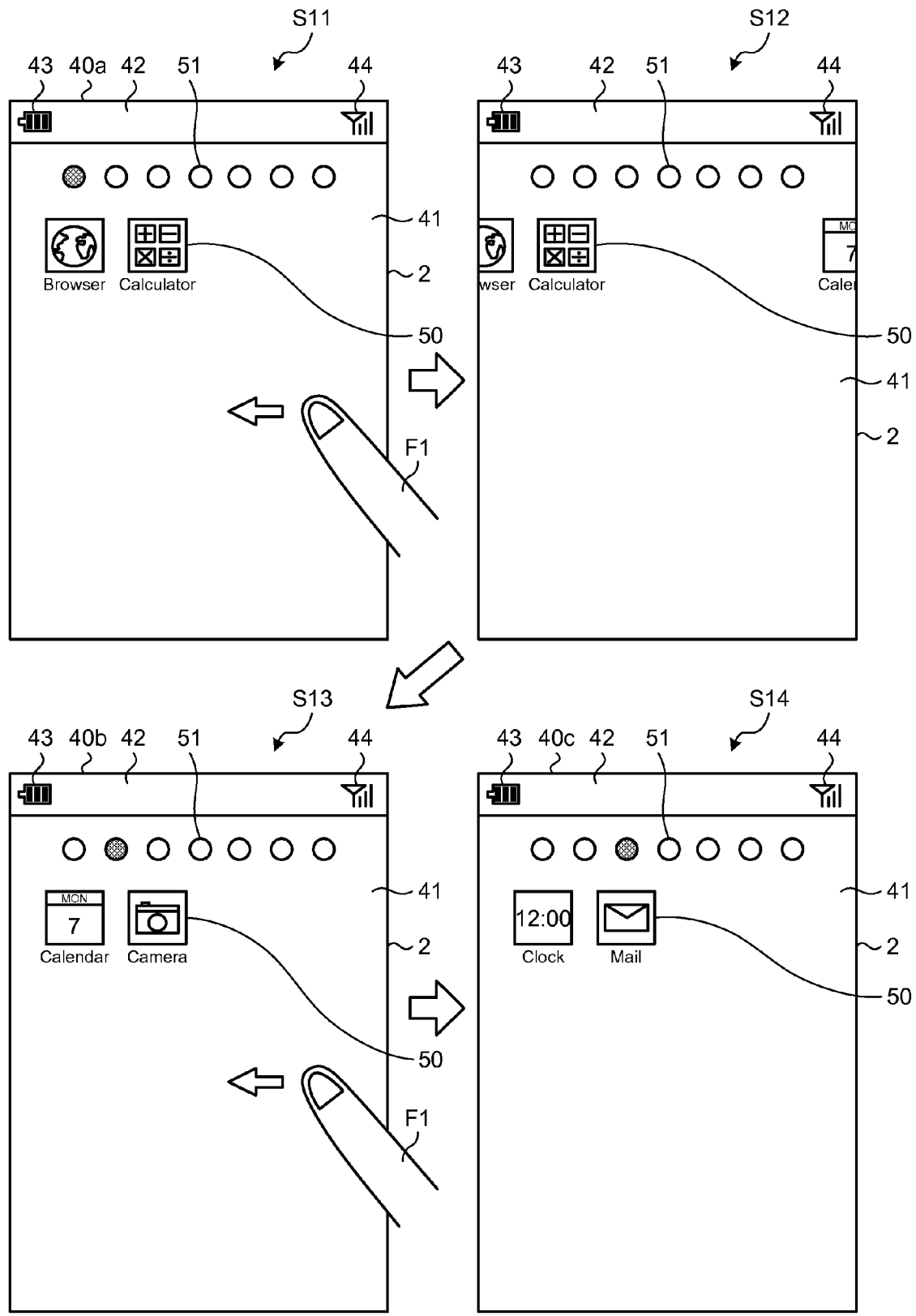
FIG. 7 is a diagram illustrating a first example of control performed by the smartphone.

FIG. 7 is a diagram illustrating a first example of control performed by the smartphone. As illustrated at Step S11, the smartphone 1 displays a home screen 40a the same as that of FIG. 4 on the display 2A. A "Browser" icon and a "Calculator" icon are arranged in an upper left area of the home screen 40a and below a locator 51. At Step S11, the smartphone 1 displays a home screen on the far left on the display 2A, and therefore a symbol on the far left of the locator 51 is displayed with a filled circle.

At Step S11, the user flicks a finger F1 leftward on the home screen 40a. When detecting the leftward flick on the home screen 40a, the smartphone 1 changes the home screen according to the rule 90a. That is, when detecting the leftward flick on the home screen 40a, the smartphone 1 displays a home screen 40b located in the right side of the home screen 40a on the display 2A instead of the home screen 40a. At this time, as illustrated at Steps S12 and S13, the smartphone 1 scrolls the home screen 40a, the home screen 40b, and icons 50 arranged on the home screen 40a and the home screen 40b leftward across the display 2A for display.

Step S12 depicts how the home screen is changing. The smartphone 1 displays so as to gradually direct the "Browser" icon and the "Calculator" icon toward the outside of the display area of the display 2A with a scroll of the home screen. At Step S12, the "Browser" icon is broken by the left edge of the display area of the display 2A, and therefore part (right half) of the "Browser" icon is displayed in the display area. In addition, at Step S12, a "Calendar" icon, which is not displayed at Step S11, is broken by the right edge of the display area of the display 2A, and therefore part (left half) of the "Calendar" icon is displayed in the display area.

At Step S13, the smartphone 1 displays the home screen 40b on the display 2A. The "Calendar" icon and a "Camera" icon are arranged in an upper left area of the home screen 40b. In addition, at Step S13, a second symbol from the left of the locator 51 is displayed with a filled circle. At this time, the smartphone 1 displays the symbol on the far left of the locator 51 displayed with the filled circle at Step S11 as an unfilled circle.

At Step S13, the user flicks the finger F1 leftward on the home screen 40b. When detecting the leftward flick on the home screen 40b, the smartphone 1 changes the home screen according to the rule 90a. That is, at Step S14, the smartphone 1 displays a home screen 40c which is a home screen on the right side of the home screen 40b on the display 2A instead of the home screen 40b. A figure illustrating how the home screen is changed from the state illustrated at Step S13 to the state illustrated at Step S14 is omitted.

At Step S14, the smartphone 1 displays the home screen 40c on the display 2A. At Step S14, a "Clock" icon and a "Mail" icon are arranged in an upper left area of the home screen 40c. In addition, at Step S14, the smartphone 1 displays a third symbol from the left of the locator 51 with a filled circle. At this time, the smartphone 1 displays the second symbol from the left of the locator 51 displayed with the filled circle at Step S13 as an unfilled circle.

Figure 8:
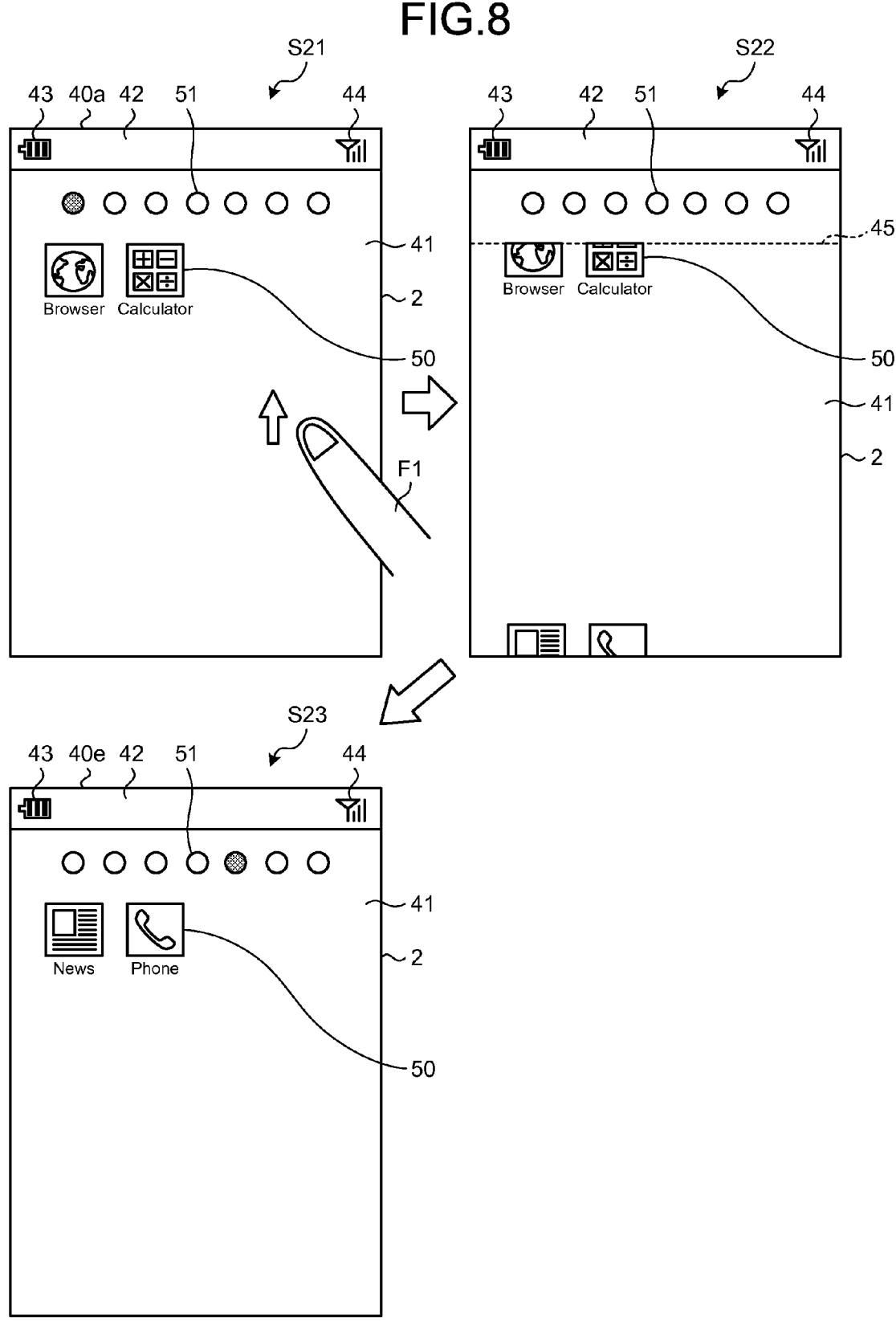
FIG. 8 is a diagram illustrating a second example of the control performed by the smartphone.

FIG. 8 is a diagram illustrating a second example of the control performed by the smartphone. The rule 90b as the second rule is set in the smartphone 1 illustrated in FIG. 8. As illustrated at Step S21, the smartphone 1 displays the home screen 40a the same as that of FIG. 4 on the display 2A. At Step S21, similarly to Step S11, the smartphone 1 displays the home screen on the far left on the display 2A, and therefore the symbol on the far left of the locator 51 is displayed with the filled circle.

At Step S21, the user flicks the finger F1 upward on the home screen 40a. When detecting the upward flick on the home screen 40a, the smartphone 1 changes the home screen according to the rule 90b. That is, when detecting the upward flick on the home screen 40a, the smartphone 1 displays a home screen 40e which is a fifth home screen from the left on the display 2A instead of the home screen 40a. At this time, as illustrated at Steps S22 and S23, the smartphone 1 scrolls the home screen 40a, the home screen 40e, and the icons 50 arranged on the home screen 40a and the home screen 40e upward across the display 2A for display.

Step S22 depicts how the home screen is changing. The smartphone 1 displays so as to gradually direct the "Browser" icon and the "Calculator" icon toward the outside of the display area of the display 2A with a scroll of the home screen. At Step S22, the smartphone 1 displays a boundary line 45 between the icons 50 and the locator 51. The boundary line 45 extends in a horizontal direction of the home screen 40a. At Step S22, the "Browser" icon and the "Calculator" icon are broken by the boundary line 45 and therefore respective parts (lower half) thereof are displayed in the display area. In addition, at Step S22, a "News" icon and a "Phone" icon not displayed at Step S21 are broken by the lower edge of the display area of the display 2A and therefore respective parts (upper half) thereof are displayed in the display area.

At Step S23, the smartphone 1 displays the home screen 40e on the display 2A. The "News" icon and the "Phone" icon are arranged on an upper left area of the home screen 40e. At Step S23, the smartphone 1 also displays a fifth symbol from the left of the locator 51 with a filled circle. At this time, the smartphone 1 displays the symbol on the far left of the locator 51 displayed with the filled circle at Step S21 as an unfilled circle.

The first example and the second example of the control performed by the smartphone have been explained so far with reference to FIG. 7 and FIG. 8.

When a leftward or rightward flick gesture is performed on a home screen displayed on the display 2A, the smartphone 1 changes the displayed home screen to another home screen according to the rule 90a set as the first rule. Meanwhile, when an upward or downward flick gesture is performed on a home screen displayed on the display 2A, the smartphone 1 changes the displayed home screen to another home screen according to the rule 90b set as the second rule. In this way, the smartphone 1 changes the home screen according to the different rules depending on the direction of a flick gesture, thus improving the operability in the case of changing a home screen to another home screen.

When a leftward or rightward flick gesture is performed on a displayed home screen, the smartphone 1 displays a home screen on the right side or the left side of the displayed home screen. In this way, by displaying a home screen next to the displayed home screen, the smartphone 1 can reliably display a home screen nearest to the displayed home screen, thus further improving the operability.

When an upward or downward flick gesture is performed on a displayed home screen, the smartphone 1 changes the displayed home screen to a previously determined home screen. In this way, by displaying the previously determined home screen, the smartphone 1 can reliably display a home screen that the user desires, thus further improving the operability.

In the second example, the smartphone 1 does not have to display the boundary line 45 on the display 2A.

Figure 9:
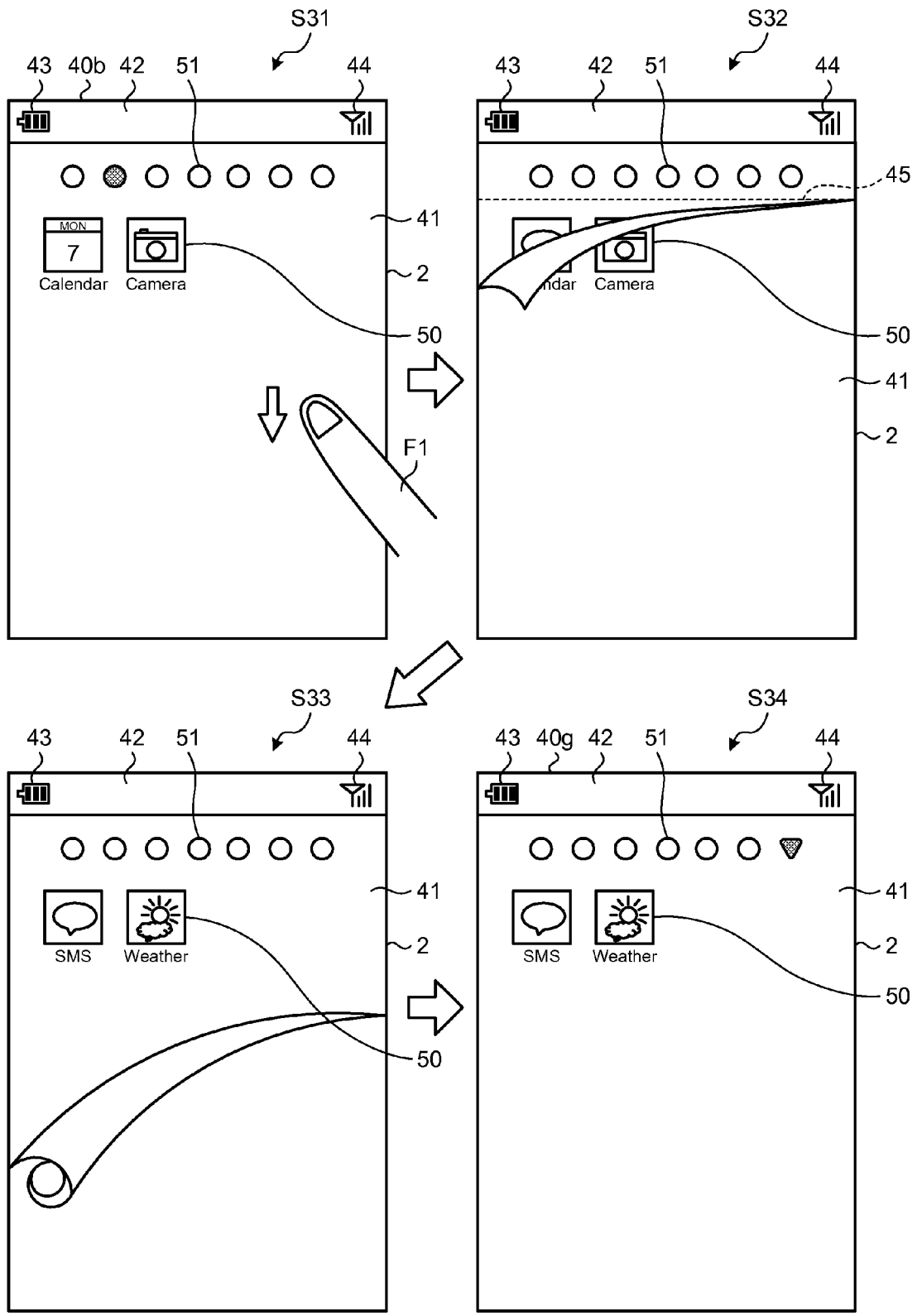
FIG. 9 is a diagram illustrating a third example of the control performed by the smartphone.

FIG. 9 is a diagram illustrating a third example of the control performed by the smartphone. At Step S31, the smartphone 1 displays the home screen 40b being the second home screen from the left on the display 2A. The "Calendar" icon and the "Camera" icon are arranged in the upper left area of the home screen 40b. The smartphone 1 displays the second symbol from the left of the locator 51 with the filled circle.

At Step S31, the user flicks the finger F1 downward on the home screen 40b. When detecting the downward flick on the home screen 40b, the smartphone 1 changes the home screen according to the rule 90b. That is, when detecting the downward flick on the home screen 40b, the smartphone 1 displays a home screen 40g which is a home screen on the far right on the display 2A instead of the home screen 40b. At this time, as illustrated at Step S32 and Step S33, the smartphone 1 displays as if the home screen 40b is turned outward and the home screen 40g appears from under it.

At Step S32, similarly to Step S22, the smartphone 1 displays the boundary line 45 extending in the horizontal direction of the home screen 40b between the icons 50 and the locator 51. In addition, at Step S32, an area where the icons 50 are arranged on the home screen 40b is displayed as if it is turned outward from its upper left portion near the boundary line 45. The "Calendar" icon and the "Camera" icon are broken by the turned portion of the home screen 40b and therefore respective parts thereof are displayed in the display area. Because the home screen 40b is turned outward, respective parts of an "SMS" icon and a "Weather" icon of the home screen 40g appear.

At Step S33, the home screen 40b is displayed as if it is further turned outward as compared with Step S32. The "Calendar" icon and the "Camera" icon become invisible by the turned portion of the home screen 40b. The whole of the "SMS" icon and the "Weather" icon then appears.

At Step S34, the smartphone 1 displays the home screen 40g on the display 2A. In addition, at Step S34, the smartphone 1 changes the shape of a symbol on the far right of the locator 51 from the circle to a triangle. The triangle is such that one side thereof is parallel to a shorter side direction of the touch screen display 2 and a vertex opposite to the one side is located in a more lower area of the display 2A than the one side. In other words, the symbol on the far right is displayed as a so-called inverted triangle. In addition, the symbol on the far right is displayed with a filled triangle.

As explained above, when the home screen is changed according to the rule 90b, the smartphone 1 changes the shape of the symbol of the locator 51 corresponding to the location of the changed home screen from the circle to the triangle. When a downward flick gesture is performed on the home screen, the smartphone 1 displays the triangular symbol so that a vertex opposite to one side thereof is directed toward the lower side of the display. Meanwhile, when an upward flick gesture is performed on the home screen, the smartphone 1 displays the triangular symbol so that a vertex opposite to one side thereof is directed toward the upper side of the display. In this way, when the home screen is changed according to the rule 90b, the smartphone 1 makes different a display mode of the locator, and this allows the user to recognize that the home screen has been changed according to the rule 90b. The smartphone 1 associates a direction of a flick gesture with a direction of a vertex of the triangular symbol of the locator, and therefore the user can recognize the shape of the symbol of the locator and the direction of a flick gesture in association with each other.

When the home screen is changed according to the rule 90a, the smartphone 1 scrolls the home screen for display. Moreover, when the home screen is changed according to the rule 90b, the smartphone 1 displays as if the displayed home screen is turned outward and another home screen appears from under it. In this way, the smartphone 1 makes different the mode of changing the home screen between the case in which the home screen is changed according to the rule 90a and the case in which the home screen is changed according to the rule 90b. Therefore, the user can recognize the change of the home screen according to the rule 90b.

In the third example, the smartphone 1 does not have to display the boundary line 45 on the display 2A.

Figure 10:
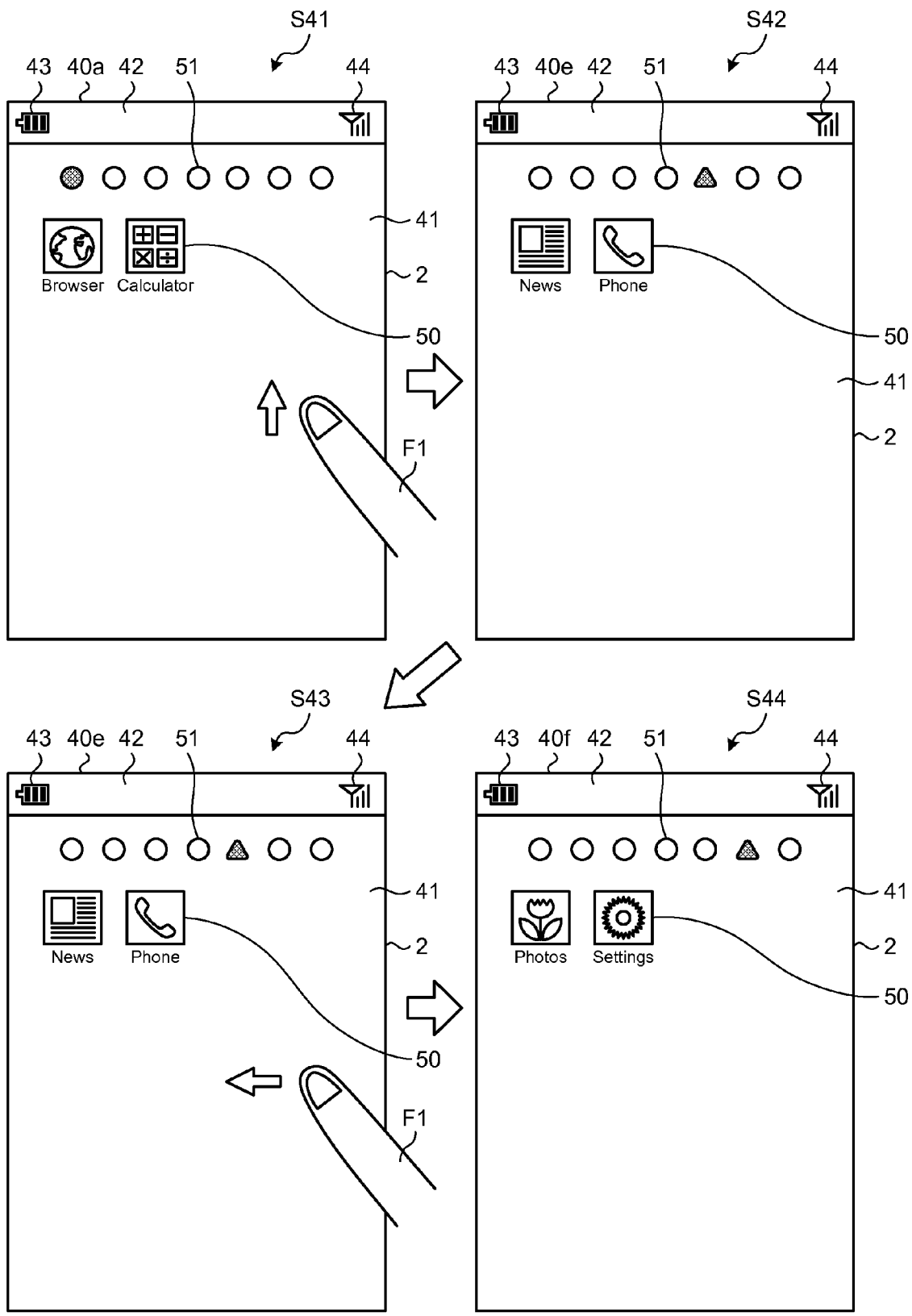
FIG. 10 is a diagram illustrating a fourth example of the control performed by the smartphone.

FIG. 10 is a diagram illustrating a fourth example of the control performed by the smartphone. As illustrated at Step S41, the smartphone 1 displays the home screen 40a the same as that of FIG. 4 on the display 2A.

At Step S41, the user flicks the finger F1 upward on the home screen 40a. When detecting the upward flick on the home screen 40a, as illustrated at Step S42, the smartphone 1 displays the home screen 40e which is the fifth home screen from the left according to the rule 90b.

At Step S42, the smartphone 1 changes the shape of the fifth symbol from the left of the locator 51 from the circle to the triangle. The triangle is such that one side thereof is parallel to the shorter side direction of the touch screen display 2 and a vertex opposite to the one side is located in a more upper area of the display 2A than the one side. The fifth symbol from the left is displayed with the filled triangle.

At Step S43, the user flicks the finger F1 leftward on the home screen 40e. When detecting the leftward flick on the home screen 40e, the smartphone 1 changes the home screen according to the rule 90a. That is, at Step S44, the smartphone 1 displays a home screen 40f located in the right side of the home screen 40e on the display 2A instead of the home screen 40e. At Step S44, a "Photos" icon and a "Settings" icon appear in an upper left area of the home screen 40f.

At Step S44, the smartphone 1 changes the shape of a sixth symbol from the left of the locator 51 from the circle to the triangle. At this time, the sixth symbol from the left is displayed in the same mode as that of the fifth symbol from the left at Steps S42 and S43. The smartphone 1 displays the fifth symbol from the left displayed as the triangle at Steps S42 and S43 as an unfilled circle.

Figure 11:
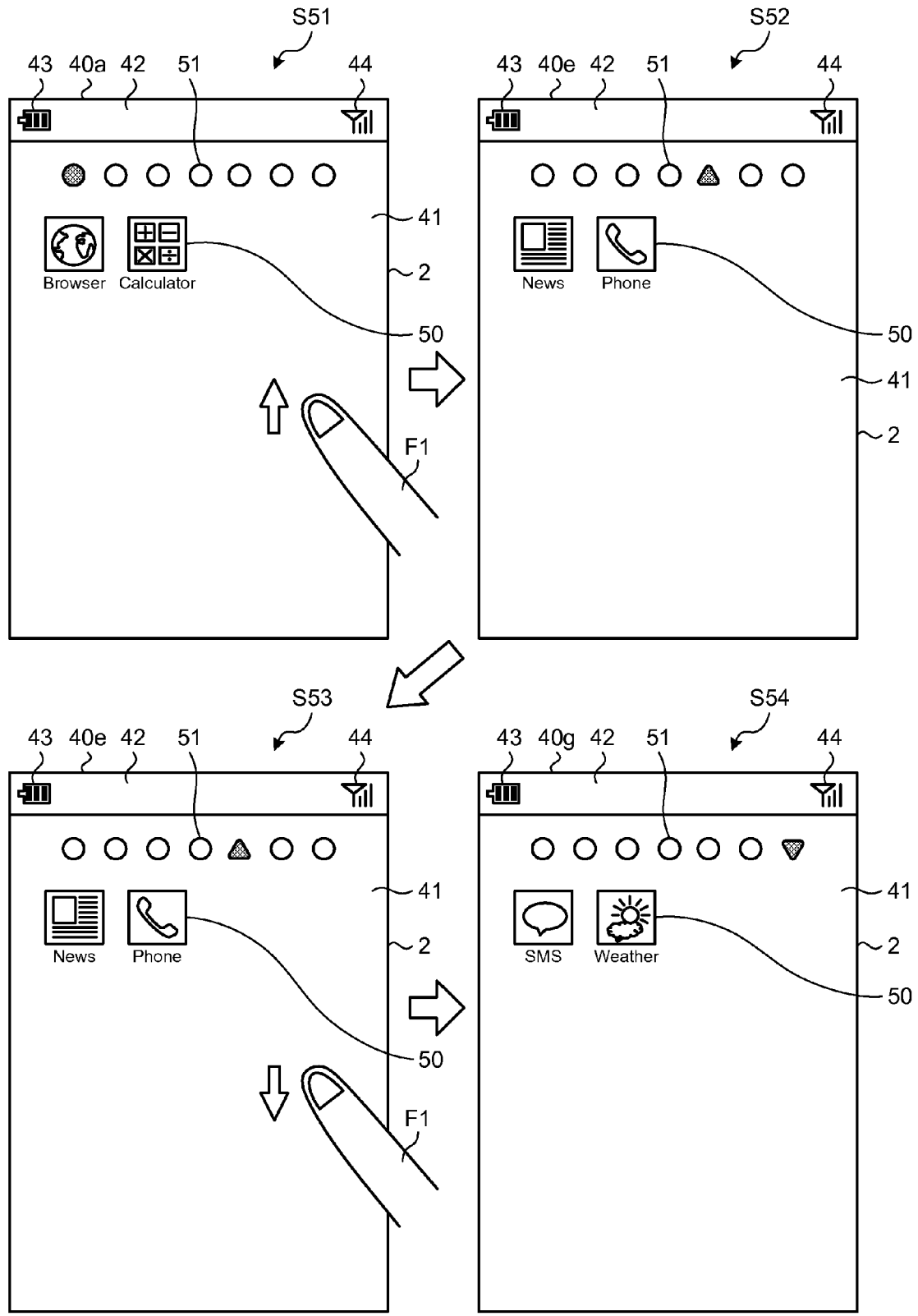
FIG. 11 is a diagram illustrating a fifth example of the control performed by the smartphone.

FIG. 11 is a diagram illustrating a fifth example of the control performed by the smartphone. As illustrated at Step S51, the smartphone 1 displays the home screen 40a the same as that of FIG. 4 on the display 2A.

At Step S51, the user flicks the finger F1 upward on the home screen 40a. When detecting the upward flick on the home screen 40a, as illustrated at Step S52, the smartphone 1 displays the home screen 40e which is the fifth home screen from the left on the display 2A. In addition, as illustrated at Step S52, the smartphone 1 changes the shape of the fifth symbol from the left of the locator 51 to the same triangle as that of Step S42 in FIG. 10.

At Step S53, the user flicks the finger F1 downward on the home screen 40e. When detecting the downward flick on the home screen 40e, the smartphone 1 changes the home screen according to the rule 90b. That is, at Step S54, the smartphone 1 displays the home screen 40g which is the home screen on the far right on the display 2A instead of the home screen 40e. In addition, at Step S54, the smartphone 1 changes the shape of the symbol on the far right of the locator 51 to the same triangle as that of Step S34 in FIG. 9.

The fourth example and the fifth example of the control performed by the smartphone have been explained so far with reference to FIG. 10 and FIG. 11.

When a flick gesture in the vertical direction is performed on the screen and the home screen is changed according to the rule 90b or the rule 90c and then a leftward or rightward flick gesture is performed on the changed home screen, the smartphone 1 changes the home screen according to the rule 90a being the first rule. When the home screen is changed according to either one of the rule 90b and the rule 90c being the second rule and then an upward or downward flick gesture is performed on the changed home screen, the smartphone 1 changes the home screen according to either one of the rule 90b and the rule 90c being the second rule. In this way, the smartphone 1 can change the home screen by combining different changing rules with each other, and therefore various ways to change the home screen can be achieved, thus further improving the operability.

Figure 12:
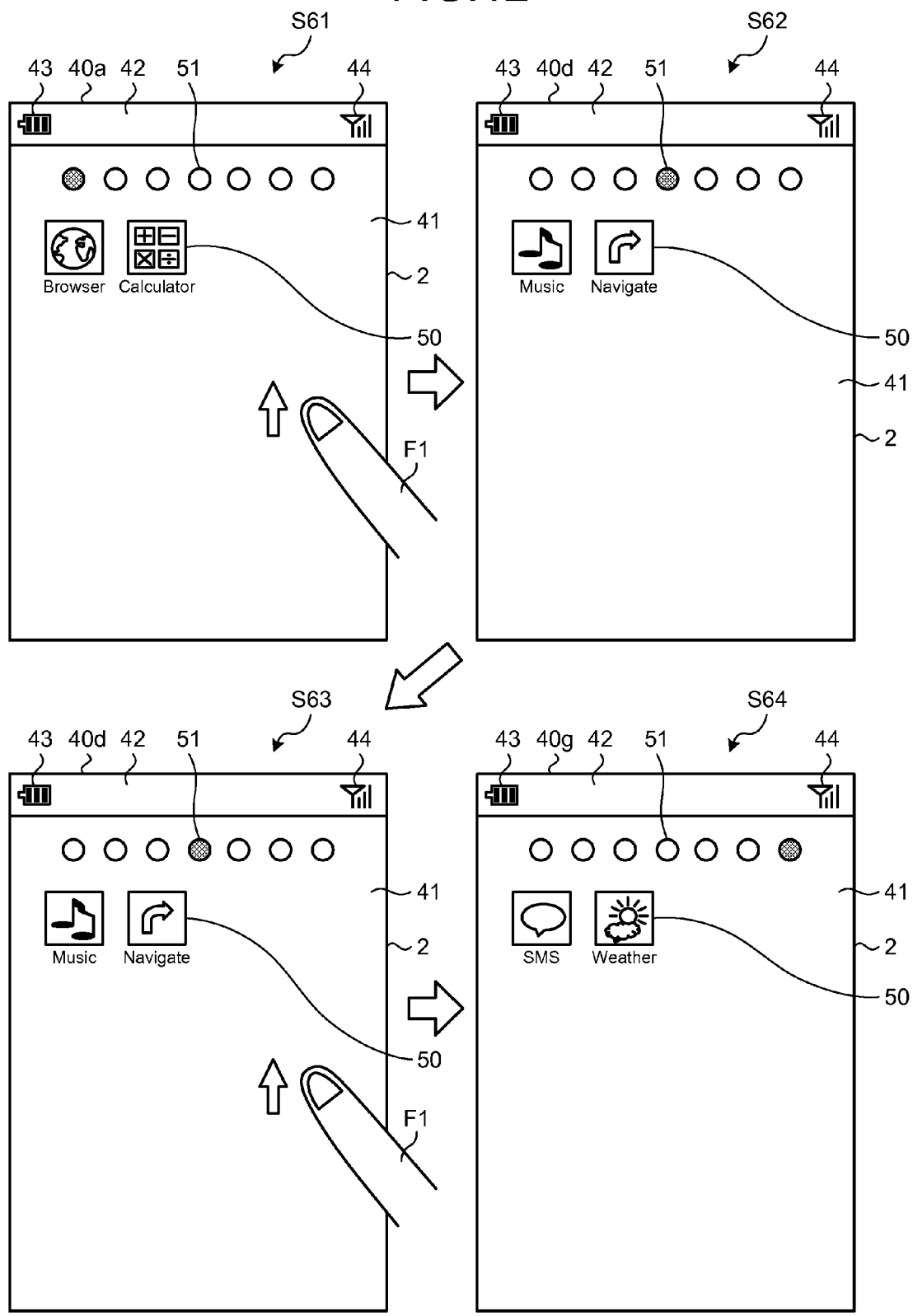
FIG. 12 is a diagram illustrating a sixth example of the control performed by the smartphone.

FIG. 12 is a diagram illustrating a sixth example of the control performed by the smartphone. The rule 90c as the second rule is set in the smartphone 1 illustrated in FIG. 12. As illustrated at Step S61, the smartphone 1 displays the home screen 40a the same as that of FIG. 4 on the display 2A.

At Step S61, the user flicks the finger F1 upward on the home screen 40a. When detecting the upward flick on the home screen 40a, as illustrated at Step S62, the smartphone 1 displays a home screen 40d on the display 2A according to the rule 90c. The home screen 40d is a home screen which is third to the right of the home screen 40a. That is, the home screen 40d is a fourth home screen from the left.

At Step S62, the smartphone 1 displays a home screen 40d on the display 2A. A "Music" icon and a "Navigate" icon are arranged in an upper left area of the home screen 40d. In addition, at Step S62, the smartphone 1 displays a fourth symbol from the left of the locator 51 with the filled circle. At this time, the smartphone 1 displays the symbol on the far left of the locator 51 displayed with the filled circle at Step S61 as an unfilled circle.

At Step S63, the user flicks the finger F1 upward on the home screen 40d. When detecting the upward flick on the home screen 40d, the smartphone 1 changes the home screen according to the rule 90c. That is, at Step S64, the smartphone 1 displays the home screen 40g which is third to the right of the home screen 40d on the display 2A instead of the home screen 40d.

At Step S64, the smartphone 1 displays a seventh symbol from the left of the locator 51, that is, a symbol on the far right with the filled circle. At this time, the smartphone 1 displays the fourth symbol from the left of the locator 51 displayed with the filled circle at Steps S62 and 63 as an unfilled circle.

When an upward flick gesture is performed on the displayed home screen, the smartphone 1 changes the displayed home screen to another home screen according to the rule 90c set in the second rule. In this way, the smartphone 1 can make constant a relative positional relation between the displayed home screen and the changed home screen, thus further improving the operability. Moreover, the smartphone 1 can set the two rules, the rule 90b and the rule 90c, in the second rule, which allows the user to select either one from the second rule. Therefore, a process for moving a home screen executed in response to a vertical flick gesture performed on the home screen can be made to a user's desired process.

Figure 13:
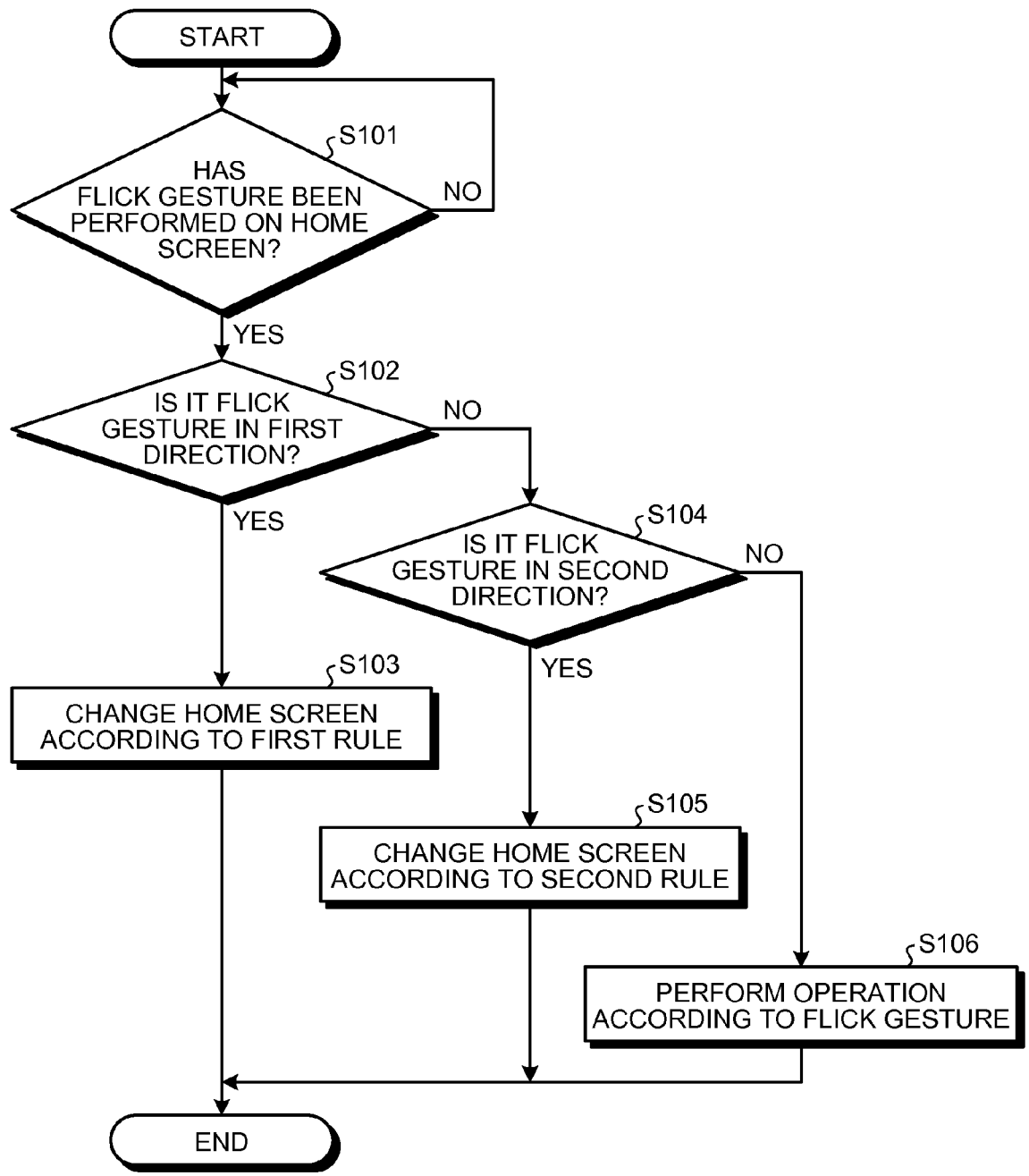
FIG. 13 is a flowchart of a procedure for the control performed by the smartphone.

Then, a procedure for changing the home screen 40 performed by the smartphone 1 will be explained below with reference to FIG. 13. FIG. 13 is a flowchart of the control performed by the controller 10 of the smartphone 1. The controller 10 may execute other procedure in parallel with the procedure illustrated in FIG. 13.

First of all, at Step S101, the controller 10 of the smartphone 1 determines whether a flick gesture has been performed on the home screen 40. When it is determined that the flick gesture has not been performed on the home screen 40 (No at Step S101), the controller 10 proceeds to Step S101. In this way, the controller 10 repeats the process at Step S101 until a flick gesture performed on the home screen 40 is detected at Step S101.

When it is determined that the flick gesture has been performed on the home screen 40 (Yes at Step S101), the controller 10 proceeds to Step S102. Then at Step S102, the controller 10 determines whether the flick gesture performed on the home screen is a flick gesture in a first direction. The flick gesture in the first direction is, for example, a rightward flick gesture or a leftward flick gesture.

When it is determined that the flick gesture performed on the home screen 40 is the flick gesture in the first direction (Yes at Step S102), the controller 10 proceeds to Step S103. At Step S103, the controller 10 reads the rule 90a from the changing rule table 9D and changes the home screen according to the read rule 90a. The controller 10 then ends a series of processes.

When it is determined that the flick gesture performed on the home screen 40 is not the flick gesture in the first direction (No at Step S102), the controller 10 proceeds to Step S104. At Step S104, the controller 10 determines whether the flick gesture performed on the home screen 40 is a flick gesture in a second direction. The flick gesture in the second direction is, for example, an upward flick gesture or a downward flick gesture.

When it is determined that the flick gesture performed on the home screen 40 is the flick gesture in the second direction (Yes at Step S104), the controller 10 proceeds to Step S105. At Step S105, the controller 10 reads the rule 90b or the rule 90c from the changing rule table 9D and changes the home screen according to the read rule 90b or rule 90c. The controller 10 then ends a series of processes.

When it is determined that the flick gesture performed on the home screen 40 is not the flick gesture in the second direction (No at Step S104), the controller 10 proceeds to Step S106. At Step S106, the controller 10 performs an operation according to the flick gesture performed on the home screen 40. The controller 10 then ends a series of processes.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

The first example to the sixth example may be combined with each other as required.

The first example to the sixth example have explained that the horizontal direction of the home screen is set as the first direction, and the vertical direction of the home screen is set as the second direction; however, the present invention is not limited thereto. For example, an upper right direction of the home screen may be set as the first direction or the second direction.

The contents of the first rule and the second rule stored in the changing rule table 9D, that is, the contents of the rule 90a, the rule 90b, and the rule 90c according to the present embodiment are not limited to the contents illustrated in FIG. 6. For example, the second rule may be defined so that when an upward flick performed on the home screen is detected, a home screen on the far left is newly displayed on the display 2A.

In the third example to the fifth example, when the home screen is changed according to the rule 90b, the smartphone 1 changes the shape of the symbol of the locator from the circle to the triangle; however, the present invention is not limited thereto. The smartphone 1 may form the shape of the symbol of the locator to, for example, a rectangle. The smartphone 1 may change, for example, a color of the symbol. Moreover, the smartphone 1 may make different a display mode of the locator when the home screen is changed according to the rule 90a or the rule 90c.

In the third example, when the home screen is to be changed, the smartphone 1 displays as if the displayed home screen is turned outward and another home screen appears from under it; however, the present invention is not limited thereto. For example, the smartphone 1 may display so that the transparency of the displayed home screen is gradually increased and another home screen thereby appears from under it.

In the sixth example, if an upward flick is performed on the home screen 40e while displaying, for example, the home screen 40e which is the fifth from the left on the display 2A, the smartphone 1 notifies the user that there is no home screen which is third to the right of the home screen 40e, and therefore does not have to change the home screen. In the above case, the smartphone 1 may display the home screen 40g which is the home screen on the far right on the display 2A. Namely, if there is no home screen at a location defined in the changing rule, the smartphone 1 notifies the user of that, and does not have to change the home screen. Alternatively, if there is no home screen at a location defined in the changing rule, the smartphone 1 may display a home screen, when it is assumed that a home screen is present at a location defined in the changing rule, nearest to the assumed home screen among a plurality of home screens that can be currently displayed.

In the first example to the sixth example, the icons 50 are arranged in, for example, the upper left area of the home screen 40a; however, the present invention is not limited thereto. The icons 50 may be arranged in a lower left area of the home screen 40a, for example.

In the first example to the sixth example, when the number of home screens is changed by user's setting, the smartphone 1 may change a location of the home screen to be displayed based on the changing rule. For example, when the number of home screens is increased by one through the user's setting, the smartphone 1 may change "the fifth from the left" which is an item corresponding to the upward flick gesture in the rule 90b to "a sixth from the left".

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
   a touch screen display configured to display one home screen of a plurality of home screens arranged in one direction; and
   a controller configured to
      change a first home screen to a second home screen of the plurality of home screens according to a first rule when a single flick gesture in a first direction along the one direction is performed on the first home screen displayed on the touch screen display, and change the first home screen to a third home screen of the plurality of home screens according to a second rule when a single flick gesture in a second direction not along the one direction is performed on the first home screen displayed on the touch screen display, wherein the second home screen is arranged next to the first home screen in the one direction, and the first home screen and the third home screen are arranged with one or more home screens interposed therebetween in the one direction.

2. The device according to claim 1, wherein
the second home screen is a home screen located in an opposite side to the first direction with respect to the first home screen.

3. The device according to claim 1, wherein,
when the home screen is changed according to the second rule and then a flick gesture in the first direction is performed on a changed home screen,
the controller is configured to change a home screen to be displayed on the touch screen display according to the first rule.

4. The device according to claim 1, wherein,
when the home screen is changed according to the second rule and then a flick gesture in the second direction is performed on a changed home screen,
the controller is configured to change a home screen to be displayed on the touch screen display according to the second rule.

5. The device according to claim 1, wherein
the touch screen display is configured to further display a locator indicating a location of a home screen displayed on the touch screen display in an array of the home screens, and
the controller is configured to change a home screen according to either one of the first rule and the second rule and to change the display of the locator according to a location of a changed home screen in the array.

6. The device according to claim 5, wherein
the controller is configured to make different a display mode of the locator corresponding to the location of the changed home screen between a case of changing a home screen according to the first rule and a case of changing a home screen according to the second rule.

7. The device according to claim 1, wherein
the controller is configured to make different a mode of changing a home screen between a case of changing a home screen according to the first rule and a case of changing a home screen according to the second rule.

8. The device according to claim 1, wherein
the first direction is either one of a rightward direction and a leftward direction of the home screen.

9. The device according to claim 8, wherein
the second direction is either one of an upward direction and a downward direction of the home screen.

10. The device according to claim 8, wherein
the controller is configured to determine an upward direction, a downward direction, a leftward direction, and a rightward direction of the home screen based on a vertical direction of text or an image displayed on the home screen.

11. A method of controlling a device including a touch screen display, the method comprising:

displaying a first home screen of a plurality of home screens arranged in one direction on the touch screen display;

changing the first home screen to a second home screen of the plurality of home screens according to a first rule when a single flick gesture in a first direction along the one direction is performed on the first home screen displayed on the touch screen display; and changing the first home screen to a third home screen of the plurality of home screens according to a second rule when a single flick gesture in a second direction not along the one direction is performed on the first home screen displayed on the touch screen display, wherein the second home screen is arranged next to the first home screen in the one direction, and the first home screen and the third home screen are arranged with one or more home screens interposed therebetween in the one direction.

12. A non-transitory storage medium storing therein a program for causing, when executed by a device including a touch screen display, the device to execute:

displaying a first home screen of a plurality of home screens arranged in one direction on the touch screen display;

changing the first home screen to a second home screen of the plurality of home screens according to a first rule when a single flick gesture in a first direction along the one direction is performed on the first home screen displayed on the touch screen display; and changing the first home screen to a third home screen of the plurality of home screens according to a second rule when a single flick gesture in a second direction not along the one direction is performed on the first home screen displayed on the touch screen display, wherein the second home screen is arranged next to the first home screen in the one direction, and the first home screen and the third home screen are arranged with one or more home screens interposed therebetween in the one direction.

* * * * *